United States Patent
Marquardt et al.

(10) Patent No.: US 11,847,205 B1
(45) Date of Patent: Dec. 19, 2023

(54) TRUSTED 5G NETWORK FUNCTION VIRTUALIZATION OF VIRTUAL NETWORK FUNCTION ELEMENTS EMBEDDED ON A SYSTEM-ON-CHIP

(71) Applicant: T-MOBILE INNOVATIONS LLC, Overland Park, KS (US)

(72) Inventors: Ronald R. Marquardt, Woodinville, WA (US); Lyle W. Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 525 days.

(21) Appl. No.: 17/080,554

(22) Filed: Oct. 26, 2020

(51) Int. Cl.
*G06F 21/53* (2013.01)
*G06F 15/78* (2006.01)
*H04L 9/40* (2022.01)

(52) U.S. Cl.
CPC .......... *G06F 21/53* (2013.01); *G06F 15/7807* (2013.01); *H04L 63/105* (2013.01); *H04L 63/20* (2013.01)

(58) Field of Classification Search
CPC ... G06F 21/53; G06F 15/7807; H04L 63/105; H04L 63/20
See application file for complete search history.

(56) References Cited

U.S. PATENT DOCUMENTS

| | | |
|---|---|---|
| 5,928,363 A | 7/1999 | Ruvolo |
| 5,983,350 A | 11/1999 | Minear et al. |
| 6,775,772 B1 | 8/2004 | Binding et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes et al. |

(Continued)

FOREIGN PATENT DOCUMENTS

| | | |
|---|---|---|
| WO | 2015039699 A1 | 3/2015 |
| WO | 2017062101 A1 | 4/2017 |

OTHER PUBLICATIONS

Notice of Allowance dated Sep. 20, 2016, U.S. Appl. No. 14/703,885, filed May 5, 2015.

(Continued)

*Primary Examiner* — Asghar H Bilgrami

(57) ABSTRACT

A communication device. The communication device comprises a transceiver comprising an antenna; and a system-on-chip. The system-on-chip comprises a central processing unit (CPU) and a non-transitory memory comprising a micro-kernel of a fifth generation (5G) core network that when executed by the CPU, causes the micro-kernel to begin executing instructions of the micro-kernel in a trusted security zone (TSZ) execution mode, create virtualized network functions (VNFs) of a core network in the TSZ execution mode, wherein the virtualized network functions are associated with a 5G core network, instantiate a 5G communication network using the antenna and the 5G core network in response to creating the VNFs of the core network, receive requests from subscribers of the 5G communication network, and connect the subscribers to the 5G communication network in response to receiving the requests from subscribers of the 5G communication network.

12 Claims, 9 Drawing Sheets

(56) References Cited

U.S. PATENT DOCUMENTS

| | | |
|---|---|---|
| 7,661,104 B2 | 2/2010 | Watt et al. |
| 7,702,951 B2 | 4/2010 | Yamamoto et al. |
| 7,849,296 B2 | 12/2010 | Watt et al. |
| 8,090,797 B2 | 1/2012 | Chinta et al. |
| 8,171,483 B2 | 5/2012 | Nord et al. |
| 8,271,976 B2 | 9/2012 | Vega et al. |
| 8,280,944 B2 | 10/2012 | Laadan et al. |
| 8,443,230 B1 | 5/2013 | James-Roxby et al. |
| 8,649,770 B1 | 2/2014 | Cope |
| 8,712,407 B1 | 4/2014 | Cope et al. |
| 8,797,875 B2 | 8/2014 | Garcia Martin et al. |
| 8,842,578 B1 | 9/2014 | Zisapel et al. |
| 8,935,318 B1 | 1/2015 | Konerding |
| 8,984,110 B1 | 3/2015 | Asveren |
| 8,996,644 B2 | 3/2015 | Pope |
| 9,047,441 B2 | 6/2015 | Xie |
| 9,104,836 B2 | 8/2015 | Burstein et al. |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,230,085 B1 | 1/2016 | Paczkowski et al. |
| 9,237,084 B2 | 1/2016 | Chapman |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,324,016 B1 | 4/2016 | Cordes et al. |
| 9,374,363 B1 | 6/2016 | Paczkowski |
| 9,384,028 B1 | 7/2016 | Felstaine et al. |
| 9,392,446 B1 | 7/2016 | Paczkowski et al. |
| 9,407,612 B2 | 8/2016 | Sood et al. |
| 9,450,866 B2 | 9/2016 | He et al. |
| 9,460,286 B1 | 10/2016 | Felstaine et al. |
| 9,503,363 B2 | 11/2016 | Sivabalan et al. |
| 9,509,587 B1 | 11/2016 | Marquardt et al. |
| 9,519,563 B2 | 12/2016 | Manghirmalani et al. |
| 9,537,741 B2 | 1/2017 | Chakrabarti et al. |
| 9,549,321 B2 | 1/2017 | Slavov et al. |
| 9,565,168 B1 | 2/2017 | Marquardt et al. |
| 9,578,664 B1 | 2/2017 | Paczkowski et al. |
| 9,613,190 B2 | 4/2017 | Ford |
| 9,686,240 B1 | 6/2017 | Ray et al. |
| 9,811,686 B1* | 11/2017 | Marquardt ............. G06Q 30/04 |
| 2002/0107958 A1 | 8/2002 | Faraldo |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orion et al. |
| 2004/0187117 A1 | 9/2004 | Orion et al. |
| 2004/0240468 A1 | 12/2004 | Chin et al. |
| 2004/0260910 A1 | 12/2004 | Watt et al. |
| 2005/0102603 A1 | 5/2005 | Tapper et al. |
| 2005/0114616 A1 | 5/2005 | Tune et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2006/0146767 A1 | 7/2006 | Moganti |
| 2006/0190614 A1 | 8/2006 | Altman et al. |
| 2006/0253701 A1 | 11/2006 | Kim et al. |
| 2007/0174253 A1 | 7/2007 | Hodnett |
| 2008/0020745 A1 | 1/2008 | Bae et al. |
| 2008/0162877 A1 | 7/2008 | Altman et al. |
| 2008/0165259 A1 | 12/2008 | Nobels |
| 2008/0301779 A1 | 12/2008 | Garg et al. |
| 2009/0071000 A1 | 1/2009 | Field et al. |
| 2009/0199177 A1 | 8/2009 | Edwards et al. |
| 2009/0241108 A1 | 8/2009 | Edwards et al. |
| 2009/0300605 A1 | 12/2009 | Edwards et al. |
| 2009/0320048 A1 | 12/2009 | Watt et al. |
| 2010/0106568 A1 | 4/2010 | Grimes |
| 2010/0192230 A1 | 7/2010 | Steeves et al. |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0304244 A1 | 11/2012 | Xie |
| 2012/0331550 A1 | 12/2012 | Raj et al. |
| 2013/0055256 A1 | 2/2013 | Banga et al. |
| 2013/0091568 A1 | 4/2013 | Sharif et al. |
| 2013/0305333 A1 | 11/2013 | Katzer |
| 2013/0333008 A1 | 12/2013 | Tapling |
| 2013/0345530 A1 | 12/2013 | McRoberts et al. |
| 2014/0013327 A1 | 1/2014 | Sherwood et al. |
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh |
| 2014/0201374 A1 | 7/2014 | Ashwood-Smith et al. |
| 2014/0241247 A1 | 8/2014 | Kempf et al. |
| 2014/0259115 A1 | 9/2014 | Bakshi et al. |
| 2014/0281529 A1 | 9/2014 | Epp et al. |
| 2014/0281544 A1 | 9/2014 | Paczkowski et al. |
| 2014/0298477 A1 | 10/2014 | Castro et al. |
| 2014/0304803 A1 | 10/2014 | Pope et al. |
| 2014/0325681 A1 | 10/2014 | Kleidermacher et al. |
| 2014/0337940 A1 | 11/2014 | Slavov et al. |
| 2014/0344912 A1 | 11/2014 | Chapman, II et al. |
| 2014/0373012 A1 | 12/2014 | Ylitalo et al. |
| 2015/0046676 A1 | 2/2015 | Archibald et al. |
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0180730 A1 | 6/2015 | Felstaine et al. |
| 2015/0195281 A1 | 7/2015 | Venkataramu et al. |
| 2015/0220937 A1 | 8/2015 | Iannace |
| 2015/0244717 A1 | 8/2015 | Jin et al. |
| 2015/0248283 A1 | 9/2015 | Gschwind et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0043944 A1 | 2/2016 | Felstaine et al. |
| 2016/0057102 A1 | 2/2016 | Wei et al. |
| 2016/0057788 A1 | 2/2016 | Sharma et al. |
| 2016/0073283 A1 | 3/2016 | Grayson et al. |
| 2016/0080323 A1 | 3/2016 | MacKay et al. |
| 2016/0094573 A1 | 3/2016 | Sood et al. |
| 2016/0127333 A1 | 5/2016 | Sood et al. |
| 2016/0142396 A1 | 5/2016 | McRoberts |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226912 A1 | 8/2016 | Clark et al. |
| 2016/0226913 A1 | 8/2016 | Sood et al. |
| 2016/0323200 A1 | 11/2016 | Xiang et al. |
| 2016/0337329 A1 | 11/2016 | Sood et al. |
| 2016/0350150 A1 | 12/2016 | Marquardt et al. |
| 2016/0352537 A1 | 12/2016 | Marquardt et al. |
| 2016/0366123 A1 | 12/2016 | Smith et al. |
| 2016/0373474 A1 | 12/2016 | Sood et al. |
| 2016/0378685 A1 | 12/2016 | Spurlock et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0102957 A1 | 4/2017 | Marquardt et al. |
| 2019/0138934 A1* | 5/2019 | Prakash ............ G06F 9/5072 |
| 2020/0014764 A1* | 1/2020 | Yousaf ............... H04W 36/14 |
| 2021/0182440 A1* | 6/2021 | Singh ............... G06F 21/6245 |
| 2021/0234861 A1* | 7/2021 | Shi ..................... G06F 21/53 |
| 2022/0038330 A1* | 2/2022 | Dutta ............... H04L 41/5025 |
| 2022/0132219 A1* | 4/2022 | Maria ............ H04N 21/63345 |

(56) References Cited

U.S. PATENT DOCUMENTS

2022/0239757 A1\* 7/2022 Marquardt .......... H04L 61/5007
2023/0007483 A1\* 1/2023 Mueck ................ H04W 12/069

OTHER PUBLICATIONS

Foreign Communication from a Related Counterpart—International Search Report and Written Opinion dated Oct. 21, 2016, filed on Aug. 11, 2016, International Application No. PCT/US2016/046648.
Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.
Marquardt, Ronald R., et al., "System and Method for Trusted Operability When Moving Between Network Functions Virtualization States," filed on Aug. 11, 2016, International Application No. PCT/US2016/046648.
Bales., Mark R., et al., "Session Aggregator Brokering of Data Stream Communication," filed on Oct. 3, 2016, U.S. Appl. No. 15/284,506.
FAIPP Pre-Interview Communication dated Feb. 7, 2017, U.S. Appl. No. 14/847,992, filed Sep. 8, 2015.
FAIPP Pre-Interview Communication dated Mar. 9, 2017, U.S. Appl. No. 14/930,146, filed Nov. 2, 2015.
Notice of Allowance dated Feb. 21, 2017, U.S. Appl. No. 14/793,344, filed Jul. 7, 2015.
Paczkowski, Lyle, W., et al., "Trusted Signaling in 3GPP Interfaces in a Network Function Virtualization Wireless Communication System," filed Jan. 10, 2017, U.S. Appl. No. 15/403,166.
FAIPP Pre-Interview Communication dated Jul. 25, 2016, U.S. Appl. No. 14/703,885, filed May 5, 2015.
Network Functions Virtualisation, "An Introduction, Benefits, Enablers, Challenges & Call for Action," Oct. 22-24, 2012, "SDN an OpenFlow World Congress," Darmstadt-Germany.
Network Functions Virtualisation, "Network Operator Perspectives on Industry Progress," Oct. 14-17, 2012, "SDN an OpenFlow World Congress," Darmstadt-Germany.
Paczkowski, Lyle, W., et al., "Trusted Signaling in 3GPP Interfaces in a Network Function Virtualization Wireless Communication System," filed Jun. 22, 2015, U.S. Appl. No. 14/746,615.
Marquardt, Ronald R., et al., "System and Method of a Trusted Computing Operation Mode," filed on May 5, 2015, U.S. Appl. No. 14/703,885.
Marquardt, Ronald R., et al., "System and Method of Establishing Trusted Operability Between Networks in a Network Functions Virtualization Environment," filed on Sep. 8, 2015, U.S. Appl. No. 14/847,992.
Marquardt, Ronald R., et al., "Dynamic Addition of Network Function Services," filed on Nov. 2, 2015, U.S. Appl. No. 14/930,146.
Marquardt, Ronald R., et al., "Securing Communication in a Network Function Virtualization (NVF) Core Network," filed on Oct. 1, 2015, U.S. Appl. No. 14/872,936.
Marquardt, Ronald R., et al., "System and Method for Trusted Operability When Moving Between Network Functions Virtualization States," filed on Oct. 9, 2015, U.S. Appl. No. 14/879,327.
Ray, Amar N., et al., "IPv6 to IPv4 Data Packet Migration in a Trusted Security Zone," filed Jul. 7, 2015, U.S. Appl. No. 14/793,344.
Notice of Allowance dated May 12, 2017, U.S. Appl. No. 15/403,166, filed Jan. 10, 2017.
Notice of Allowance dated Apr. 25, 2017, U.S. Appl. No. 14/847,992, filed Sep. 8, 2015.
Notice of Allowance and Fees dated May 26, 2017, U.S. Appl. No. 14/930,146, filed Nov. 2, 2015.
Ray, Amar N., et al., "IPv6 to IPv4 Data Packet Migration in a Trusted Security Zone," filed May 22, 2017, U.S. Appl. No. 15/602,057.

\* cited by examiner

TRUSTED 5G NETWORK FUNCTION VIRTUALIZATION OF VIRTUAL NETWORK FUNCTION ELEMENTS EMBEDDED ON A SYSTEM-ON-CHIP

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as, for example, smart phones, tablet computers, machine-type-communication devices, tracking devices, and/or embedded wireless modules (whether or not user operated) are widely deployed in a wireless network, such as a cellular network. The cellular network may provide wireless data services to these mobile communication devices, for example, wireless data services such as machine-control, internet-access, media-streaming, and/or social-networking. Cellular networks may exchange wireless signals with mobile communication devices using wireless network protocols. Exemplary wireless network protocols include Institute of Electrical and Electronic Engineers (IEEE) 802.11 (WIFI), Long Term Evolution (LTE), fifth generation (5G) new radio (5GNR), and Low-Power Wide Area Network (LP-WAN).

A cellular network may include an access node (e.g., base station) wirelessly communicating with a core network. The access node may serve multiple communication devices or user equipment (UE) in a geographical area covered by a radio frequency (RF) transmission range of the access node. The access node may be an LTE eNodeB or a 5G gNodeB. Each access node may be wirelessly coupled to the core network to provide UE connectivity with various application servers and/or transport networks, such as the public switched telephone network (PSTN) and/or the Internet. With this arrangement, a mobile communication device within coverage of the cellular wireless network may engage in air interface communication with the access node and could thereby communicate via the access node with various application servers and other entities.

SUMMARY

In an embodiment, a communication device comprising an antenna; and a system-on-chip (SoC) is disclosed. The SoC comprises a central processing unit (CPU) and a non-transitory memory comprising a micro-kernel of a fifth generation (5G) core network that when executed by the CPU, causes the micro-kernel to execute instructions of the micro-kernel in a trusted security zone (TSZ) execution mode, create virtualized network functions (VNFs) of a core network in the TSZ execution mode, where the virtualized network functions are associated with a 5G core network, instantiate a 5G communication network using the antenna and the 5G core network in response to creating the VNFs of the core network, receive requests from subscribers of the 5G communication network, and connect the subscribers to the 5G communication network in response to receiving the requests from subscribers of the 5G communication network.

In another embodiment, a communication device is disclosed. The mobile communication device includes a central processing unit (CPU) comprising a hardware root of trust; and a non-transitory memory comprising virtualized network functions (VNFs). The instructions of the VNFs, when executed by the CPU, cause the VNFs to instantiate a fifth generation (5G) communication network, receive requests from subscribers of the 5G communication network, and connect the subscribers to the 5G communication network in response to receiving the requests from subscribers of the 5G communication network.

In yet another embodiment, a method of instantiating a communication network implemented by a communication device is disclosed. The method comprises executing instructions of a micro-kernel in a trusted security zone (TSZ) execution mode, create virtualized network functions (VNFs) of a core network in the TSZ execution mode, where the virtualized network functions are associated with a 5G core network, instantiate a 5G communication network using an antenna and the 5G core network in response to creating the VNFs of the core network, receive requests from subscribers of the 5G communication network, and connect the subscribers to the 5G communication network in response to receiving the requests from subscribers of the 5G communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
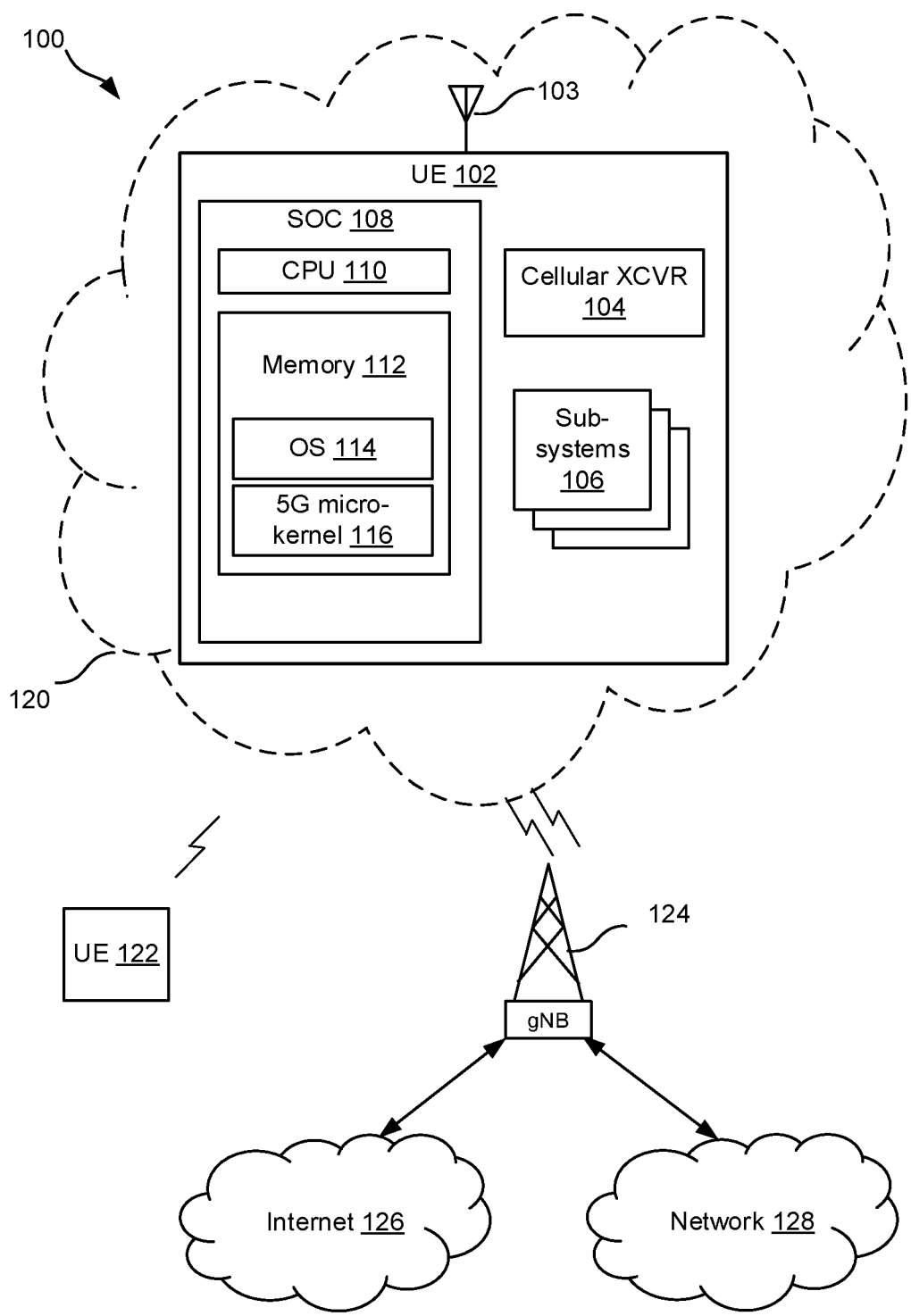
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices are widely deployed in a cellular wireless network and used by people in all walks of life in the United States and other nations. In a cellular wireless network for example, in a 5G cellular network, a base station can include a radio access network (RAN) node such as, for example, a 5G evolved or enhanced gigabit Node B (gNB). These RANs use a radio access technology (RAT) to communicate between the RAN Node and the mobile communication device (or UE). Each access node may be coupled to a 5G core network so as to provide connectivity with various application servers and/or transport networks, such as the public switched telephone network (PSTN) and/or the Internet for instance.

The 5G core (5G core) network may include a network function virtualization (NFV) infrastructure where network elements of the 5G core network may be virtualized as network functions (or services) at a mobile network operator's cloud servers. For instance, these network functions may be instantiated from software kernels as virtualized network functions (VNFs) at servers in a cloud computing environment. In some circumstances, these software kernels may become compromised as a result of attacks on the software kernel code. For instance, the software kernel for the 5G core network may not be adequately secured in a trusted execution environment at a cloud server, and therefore could be subject to malicious attacks from cyber attackers. As a result, the cloud servers may not be able to block or prevent malware or other viruses from corrupting the software kernel. The corrupted software may affect the 5G core network and cause disruption in service to subscribers of the wireless network.

In an embodiment, a system with a user equipment (UE) in the present application may be a smart high-science appliance such as, for example, a smart car, a mobile wireless phone, or a fixed/immobile smart appliance such as, for example, a smart refrigerator. The UE comprises an antenna, a cellular transceiver, sub-systems of the UE, and a system-on-chip (SoC). The SoC may embed instruction code of a kernel of a 5G core network as a 5G micro-kernel on the UE. The 5G micro-kernel includes executable instructions that may be executed on the UE in a trusted security zone (TSZ) in order to create VNFs of the 5G core network. The VNFs provide a network domain to the sub-systems and other external UE that may connect to the network domain. The UE may include a cellular transceiver comprising an antenna that may be the access nodes for establishing a radio access network (RAN). In an embodiment, the access nodes may be coupled to the 5G core network to create a 5G communication network within the network domain (also referred to as a "5G micro network"). The 5G communication network may be independent of other 5G core networks ("macro networks") of mobile operators. The UE may communicate with the sub-systems using the VNFs of the 5G communication network. In an embodiment, other UEs may roam onto the 5G communication network in order to obtain network services. Thus, a scaled down 5G communication network may be provided inside the UE. Multiple sub-systems within the UE may connect to the 5G communication network and create a 5G communication domain. These sub-systems may be managed by the 5G micro-kernel in order to provide communication channels for each subsystem within the UE and to exterior communication networks. Further, securing the 5G micro-kernel behind a hardware root of trust (or within a trusted execution environment) prevents malware or other viruses from corrupting the software code of the 5G micro-kernel.

A trusted security zone (TSZ) provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile communication device chipset and protecting the hardware root of trust removes the need for separate secure hardware to authenticate the device or user. To ensure the integrity of the applications requiring trusted data, such as a 5G core network, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile communication device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is being incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone (TSZ) is implemented by partitioning all of the hardware and software resources of the mobile communication device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The TSZ is implemented by partitioning the hardware and software resources to exist in a secure subsystem which is not accessible to components outside the secure subsystem. The TSZ is built into the processor architecture at the time of manufacture through hardware logic present in the trusted security zone which enables a perimeter boundary between the secure partition and the normal partition. The TSZ may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the TSZ by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The TSZ runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the TSZ and thus preserves the trust of the device. The security of the system is achieved at least in part by partitioning the hardware and software resources of the user equipment so they exist in one of two partitions, the secure partition for the security subsystem and the normal partition for everything else. Placing the TSZ in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile communication device which may execute in the normal partition operating system described above. The TSZ runs a separate operating system for the secure partition that is installed by the mobile communication device manufacturer or vendor, and users are not able to install new applications in or alter the contents of the TSZ.

The system taught herein instantiates a 5G micro network at the UE from a reduced instruction set of a 5G core network to provide a private network domain. 5G macro network require large processing and storage capabilities in a cloud computing environment to provide 5G services. However, the system taught herein embeds the reduced instruction set of a 5G core network on a SoC of the UE and eliminates software components not needed to create the 5G micro network thereby minimizing the memory and hardware capabilities that are needed on the UE. Further, the reduced instruction set of the 5G core network is secured behind a hardware root of trust (or within a trusted execution environment) on the SoC and eliminates the threat of malware or other viruses from corrupting the software code on the UE. Further, using a reduced instruction set on the SoC may instantiate a 5G micro network from a minimal number of VNFs such as, for example, from an Access and Mobility Management Function (AMF), a Session Management Function (SMF) and a User Plane Function (UPF) and thereby avoids needing large memory capacities of a cloud server for instantiating the 5G network. Further, instantiating a 5G micro network from a minimal number of VNFs provisioned on the UE may allow various UEs having processing and transmission hardware to instantiate 5G micro networks and readily provide 5G services to subscribers of the 5G micro network. The system taught herein allow subscribers of the 5G micro network to communicate data associated with functions/services that are provided within the private network domain of the UE without needing to connect to a 5G macro network for receiving 5G services.

Turning now to FIG. 1, a communication system 100 is described according to an embodiment. In an embodiment, the communication system 100 is configured to construct a 5G communication network 120 that is independent of another external 5G communication network of a mobile operator. The communication system 100 may comprise UE 102, UE 122, cell site 124, an Internet 126, and a communication network 128. The UE 102 may be a high-science appliance such as, for example, a smart vehicle, a smart refrigerator, a mobile communication device, or another similar smart device that has one or more processors, memory, and transceiver components. The UE 102 may be a fixed or a mobile communication device.

In an embodiment, the UE 102 comprises an antenna 103, a cellular transceiver 104, UE sub-systems 106, and a system-on-chip (SoC) 108. In an embodiment, the antenna 103 may be communicatively coupled to the cellular transceiver 104 and the sub-systems 106 through a wireless connection. The antenna 103 may include radio frequency (RF) reception and transmission components of the UE 102. In an embodiment, the antenna 103 may be part of the cellular transceiver 104. In an embodiment, the cellular transceiver 104 may establish a radio communication link to the sub-systems 106 by transmitting and receiving wireless (RF) signals using the antenna 103. In another embodiment, the cellular transceiver 104 may establish a radio communication link to the cell site 124 using the antenna 103. The radio communication link may be established according to an long term evolution (LTE) protocol, a code division multiple access (CDMA) protocol, a global system for mobile communications (GSM) protocol, or a 5G telecommunication protocol. While not shown in FIG. 1, the cellular radio transceiver 104 may include additional circuit components to process and manipulate the wireless signals at the UE 102. In an embodiment, the cellular transceiver 104 includes a 5G radio access technology (RAT) that provides an air interface for the UE 102.

The UE 102 may be communicatively coupled to the UE 122 and the cell site 124. The cell site 124 connects the UE 102 to the Internet communication network 126 or the communication network 128. The communication network 128 may be a core network (for example, a macro network) of a network provider. In an embodiment, the UE 102 may request services, via the cell site 124, for subscribers of the 5G communication network 120 from the Internet 126 and the communication network 128 using the radio communication link. The system 100 may comprise additional communication networks similar to communication network 128 and any number of cell sites 124.

The sub-systems 106 may be the systems and/or components of the UE 102. In an embodiment, when the UE 102 is a smart vehicle, the sub-systems 106 may be associated with a fuel system, an entertainment system, an electrical system, an engine system, a braking system, or the like. In another embodiment, when the UE 102 is a smart refrigerator, the sub-systems 106 may be a refrigeration system, sensors, lighting systems, refrigerated components within the refrigerator that can wirelessly connect to other sub-systems, or the like. The communication network 120 may provide 5G services to the sub-systems 106 using network functions. The 5G services include using the VNFs in the communication network 120 to provide enhanced mobile broadband for virtual reality and augmented reality applications for network slicing, remotely controlling critical infrastructure, vehicles, and medical procedure in ultra-reliable low-latency communications (uRLLC), and connecting embedded sensors for IoT applications.

Network functions of the UE 102 may offer 5G services to the sub-systems 106 by extending application programming interfaces (APIs) to those network functions of the sub-systems 106 that call the services of the UE 102 via the APIs. In embodiments, the network functions may include registration and connection management of the sub-systems 106, access to functions of the sub-systems 106, access to other network functions, or the like. The sub-systems 106 may connect with other sub-systems 106 in the communication network 120 that is provided by the UE 102. Further, the sub-systems 106, the UE 122 and/or applications may receive 5G services from the communication network 128 and/or the Internet 126. For instance, the UE 102 may connect the sub-systems 106 to the communication network 120 of the UE 102 and connect various functions of the sub-systems 106 related to system diagnostics, engine diagnostics, entertainment, navigation, or the like to the communication network 120 of the UE 102. In other embodiments, the UE 102 may connect the functions of the sub-systems 106 to the UE 122 using the VNFs of the communication network 120.

The SoC 108 is a chipset integrating a central processing unit (CPU) 110, and a memory 112 onto a single substrate. In an embodiment, the memory 112 comprises a non-transitory portion that embeds one or more applications in a hardware root of trust that is executed in a secure execution environment. In embodiments the memory 112 embeds an operating system (OS) kernel 114 and a 5G micro-kernel 116. In an embodiment, the OS 114 comprises executable instructions of an OS kernel of the UE 102. In an embodiment, the OS 114 may be executed in a normal execution environment or a secure execution mode to perform operations such as, for example, disk management, memory management, task management, etc., on the UE 102. In an embodiment, the 5G micro-kernel 116 may be a software program comprising a reduced instruction set of a kernel ("micro-kernel") of a 5G core network. The 5G micro-kernel 116 includes executable instructions that may be executed by CPU 110 in a secure execution mode to provide functions/services of the 5G core network. The network functions may be referred to as virtualized network functions (VNFs) that are created when executing instruction code of the 5G micro-kernel 116. As used herein, a reduced instruction set of the 5G micro-kernel 116 may be an instruction set that omits some operating system utilities that are not anticipated to be needed for the VNFs of the 5G core network. For instance, the reduced instruction set may omit software codes or components that are not anticipated to be needed such as, for example, software utilities for scheduling jobs such as "cron", command line script interpreters, or some device drivers for input/output devices.

The UE 102 may include access nodes of a RAN to provide coverage to the sub-systems 106 and the UE 122 in which they operate. In an embodiment, the access nodes may include the antenna 103 and the cellular transceiver 104. The access nodes establish an access network, which may be referred to as a radio access network (RAN) in some contexts. In an embodiment, the access nodes may be coupled to the 5G core network to provide a virtualized 5G communication network 120. The 5G communication network 120 may operate as a private network in a domain that is independent of the services/VNFs provided by external networks. In an embodiment, the 5G communication network 120 may provide subscribers of the 5G communication network 120 with access to 5G services when connected to the 5G communication network 120. In an embodiment, the 5G communication network 120 may also provide subscribers of the 5G communication network 120 access to services of external entities, networks and connectivity with various applications, application servers and/or transport networks, such as the public switched telephone network (PSTN), the Internet 126, or the communication network 128. In embodiments, the 5G communication network 120 may provide 5G services to subscribers connected to it as well as be independent of 5G services provisioned by another mobile network operator, for instance, a mobile network operator of the communication network 128.

In an embodiment, the subscribers may send requests to subscribe/connect to the 5G communication network 120. In some non-limiting examples, the requests may include registration and connection requests, session management or the like. The 5G micro-kernel 116 may use user data such as subscriber/customer profile information, customer authentication number, and encryption keys for connection with the 5G communication network 120. The 5G services may include aggregating data traffic, authenticating subscribers and devices, applying personalized policies and managing the mobility of the subscribers before routing the traffic to subscribers within the UE 102 or external networks such as the communication network 128 or to the Internet 126. While FIG. 1 is depicted with a single virtualized 5G communication network 120, it is to be appreciated that the 5G RATs and the VNFs may be separated into multiple virtual 5G networks that can support network slicing using different radio access networks (RANs) or various types of services for certain customer segments.

The 5G micro-kernel 116 may manage the VNFs of the UE 102. In an embodiment, the 5G micro-kernel 116 may include instructions that when executed manage requests to the VNFs for providing the 5G services of the 5G communication network 120. In this way, the 5G micro-kernel 116, in an embodiment, manages connections to the subscribers, for example, to the sub-systems 106 and the UE 122. The 5G micro-kernel 116 may also track performance of the 5G communication network 120, and faults and security of the VNFs within the 5G communication network 120. The 5G micro-kernel 116 may scale up/down the quantity of VNFs of the UE 102 to provide multiple virtualized 5G communication networks that support network slicing, ultra-reliable low-latency communications (uRLLC) and enhanced machine-type communications (eMTC) or massive Internet-of-Things (IoT) within the 5G communication network 120 of the UE 102.

Figure 2:
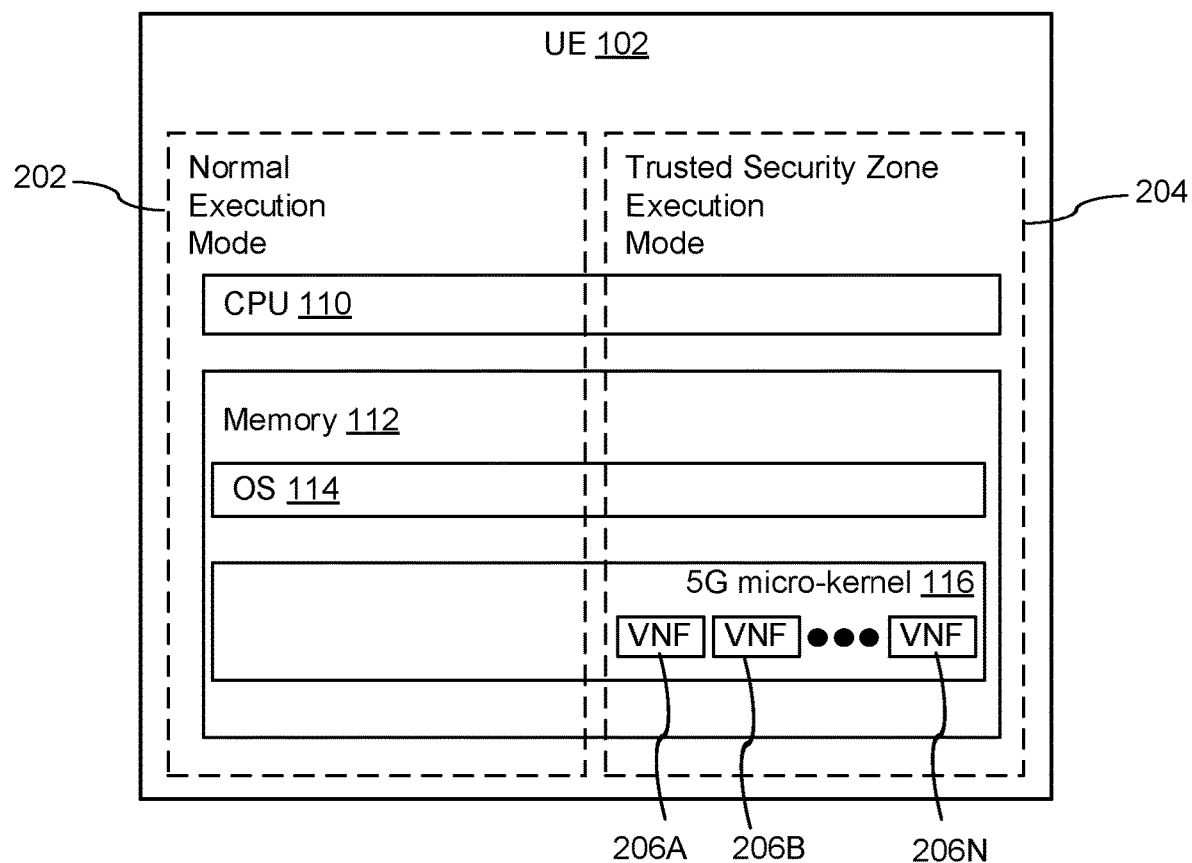
FIG. 2 is a block diagram of a communication device according to an embodiment of the disclosure.

Turning now to FIG. 2, the UE 102 is described according to an embodiment. In an embodiment, the OS 114 and the 5G micro-kernel 116 may be embedded within the memory 112. In an embodiment, the memory 112 may comprise a portion associated with the normal execution mode 202 and a portion associated with the trusted security zone (TSZ) execution mode 204. The CPU 110 is configured to be capable of executing instructions in either the normal execution mode 202 or the TSZ execution mode 204. In the normal execution mode 202, the CPU 110 may execute instructions or code of the OS 114. When the OS kernel 114 (or a selection of instructions of the OS 114) is executed in the normal execution mode 202, the OS 114 may perform operations such as, for example, operations to manage input/output data requests to the UE 102 (e.g., from software and/or an application), translate the requests into instructions (e.g., data processing instructions) for execution by the CPU 110 or other components of the UE 102, manage the UE 102 resources, such as the CPU 110, and the memory 112 when executing and providing services to applications on the UE 102.

In an embodiment, the CPU 110 may execute instructions of the 5G micro-kernel 116 in the TSZ execution mode 204 to create network functions of a core network. The network functions may be referred to as virtual network functions (VNFs) in some contexts. When the 5G micro-kernel 116 (or a selection of instructions of the 5G micro-kernel 116) is executed in the TSZ execution mode 204, the 5G micro-kernel 116 may create the VNFs 206A-206N representing 5G core network elements that are used to construct a 5G core network at the UE 102. In an embodiment, the 5G micro-kernel 116 may be located on or embedded in the memory 112 on the SoC 108 (FIG. 1) for execution within the TSZ execution mode 204. In an embodiment, the 5G micro-kernel 116 control access to the VNFs 206A-206N, and may facilitate controlling operation of the network functions of the VNFs 206A-206N in the TSZ execution mode 204. In another embodiment, the UE 102 executes instructions of the 5G micro-kernel 116 in a central processing unit (CPU) of the UE 102, in a digital signal processor (DSP) of the UE 102, in a field programmable gate array (FPGA) of the UE 102, in a graphics processing unit (GPU) of the UE 102, or in an application integrated circuit (ASIC) of the UE 102. In an embodiment, the VNFs 206A-206N may be managed to provide 5G services of a 5G communication network 120 (FIG. 1) to the sub-systems 106 and the UE 122 to the UE 102 within the 5G communication network 120. The 5G services are shown and described in FIG. 6B. In embodiments, the VNFs 206A-206N may be, for example, a user plane function (UPF), an authentication server function (AUSF), an access and mobility management function (AMF), a session management function (SMF), a network exposure function (NEF), a network repository function (NRF), a policy control function (PCF), a unified data management (UDM), a network slice selection function (NSSF), and other network functions.

Figure 3:
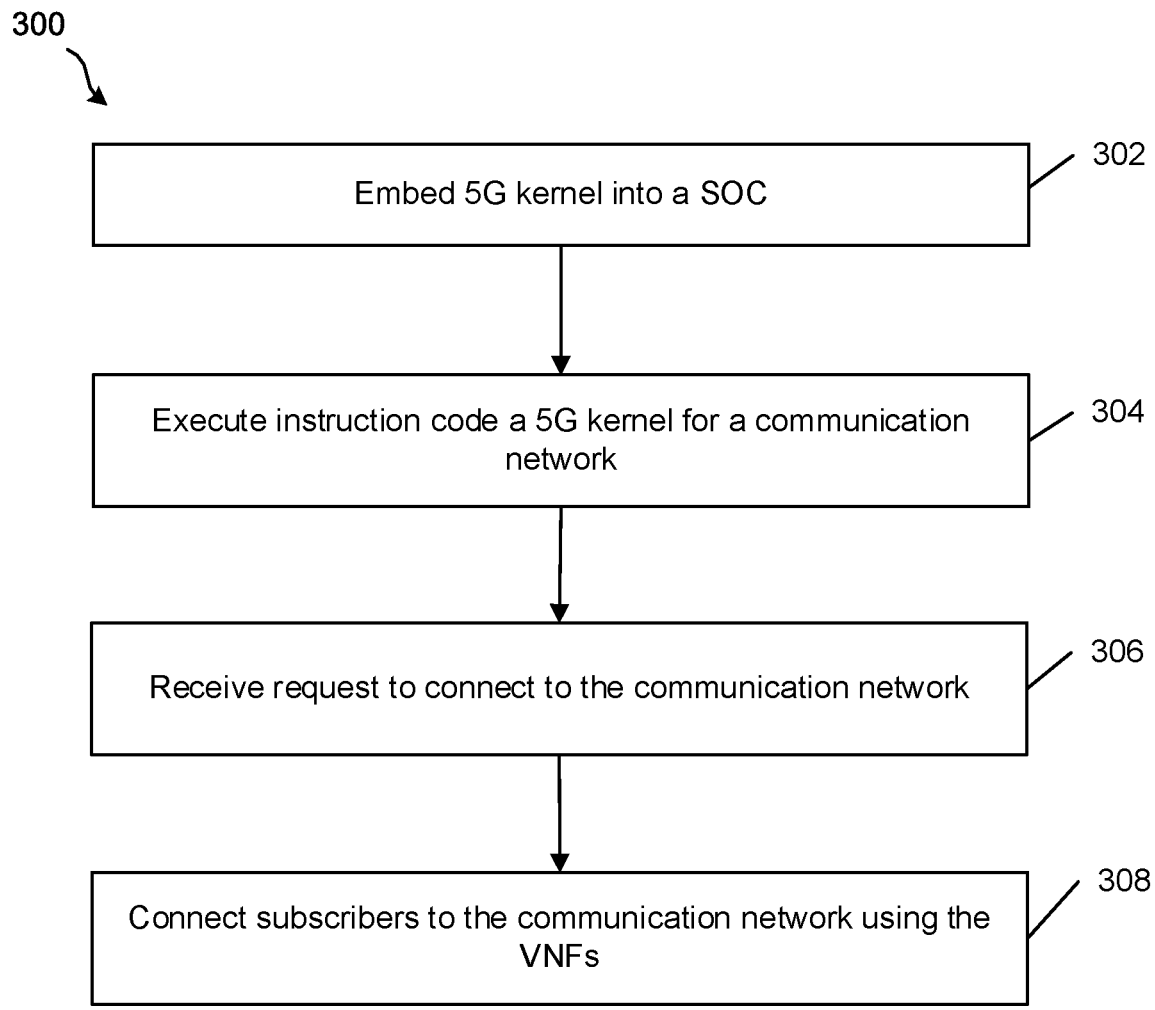
FIG. 3 is a flow chart of a method according to an embodiment of the disclosure.

Turning now to FIG. 3, a method 300 is described. In an embodiment, the method 300 is a method for constructing a 5G communication network within a communication device. In an embodiment, the communication device may be the UE 102 in FIG. 1. At block 302, the method 300 comprises embedding instruction code of a 5G software kernel into a system-on-chip (SoC). The instruction set of the 5G micro-kernel may include a micro kernel of a 5G core network.

At block 304, the method 300 comprises executing instructions of the 5G micro-kernel (or a selection of instructions of the 5G micro-kernel) in a trusted security zone (TSZ) execution mode on the communication device to construct a 5G core network at the communication device. In an embodiment, the instructions of the 5G micro-kernel may be executed by a CPU of the communication device. In another embodiment, the instructions of the 5G kernel may be executed by a digital signal processor (DSP) of the communication device, in a field programmable gate array (FPGA) of the communication device, in a graphics processing unit (GPU) of the communication device, or in an application integrated circuit (ASIC) of the communication device. Executing instructions of the 5G micro-kernel builds VNFs representing virtual network elements of a 5G core network. The VNFs and access nodes of the UE may be used to construct a 5G communication network, for example, the 5G communication network 120 (FIG. 1). In an embodiment, the 5G micro-kernel may create VNFs for multiple virtual 5G communication networks that can support network slicing.

At block 306, the method 300 comprises receiving requests from subscribers to subscribe/connect to the 5G communication network. In an embodiment, the requests may be received from sub-systems 106 (FIG. 1) on the communication device and other external UEs 122 (FIG. 1) to the communication device. The requests may include registration and connection requests, session management or the like.

At block 308, the method 300 comprises connecting the subscribers to the 5G communication network using the VNFs in response to receiving the requests from subscribers, for example, the sub-systems 106 (FIG. 1) and other external UEs 122 (FIG. 1). Once connected, the 5G communication network may provide 5G services to subscribers of the 5G communication network. In an embodiment, the 5G micro-kernel may access user data of the sub-systems and the external UEs such as, for example, customer profile information, customer authentication number and encryption keys, to manage the connection of the sub-systems and the external UEs to the 5G communication network. In an embodiment, the 5G micro-kernel may include instructions that when executed manage requests to the VNFs in order to provide 5G services to the subscribers of the 5G communication network 120. In an embodiment, the subscribers may be the sub-systems 106 and the UE 122 that connect to the 5G communication network 120. In an embodiment, the 5G micro-kernel may also manage connection requests of the sub-systems and the external UEs to external communication network, for example, to a PSTN, the Internet, or macro networks.

Figure 4:
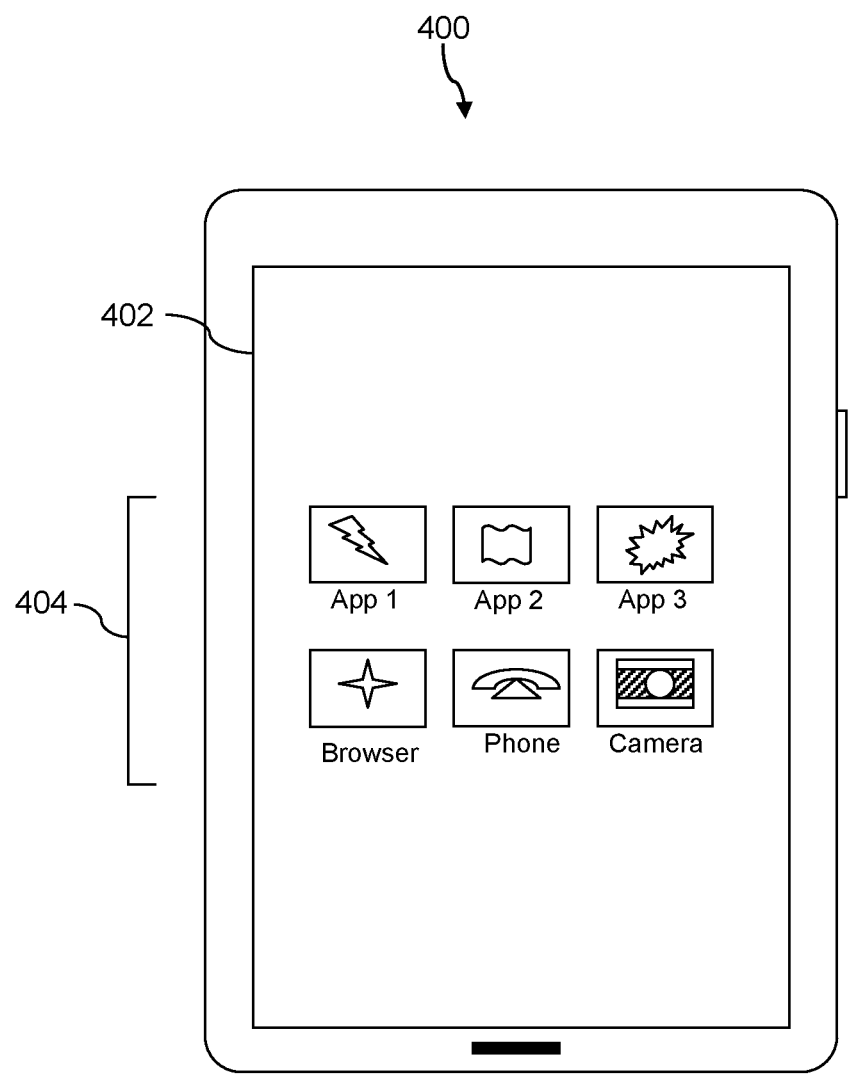
FIG. 4 is an illustration of a communication device according to an embodiment of the disclosure.

FIG. 4 depicts user equipment (UE) 400, which is operable for implementing aspects of the present disclosure, but the present disclosure should not be limited to these implementations. Though illustrated as a communication device, the UE 400 may take various forms including a smart vehicle, a smart appliance (for example, a smart refrigerator), a smart phone, a wearable computer, a personal digital assistant (PDA), a headset computer, a laptop computer, a notebook computer, and a tablet computer.

The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
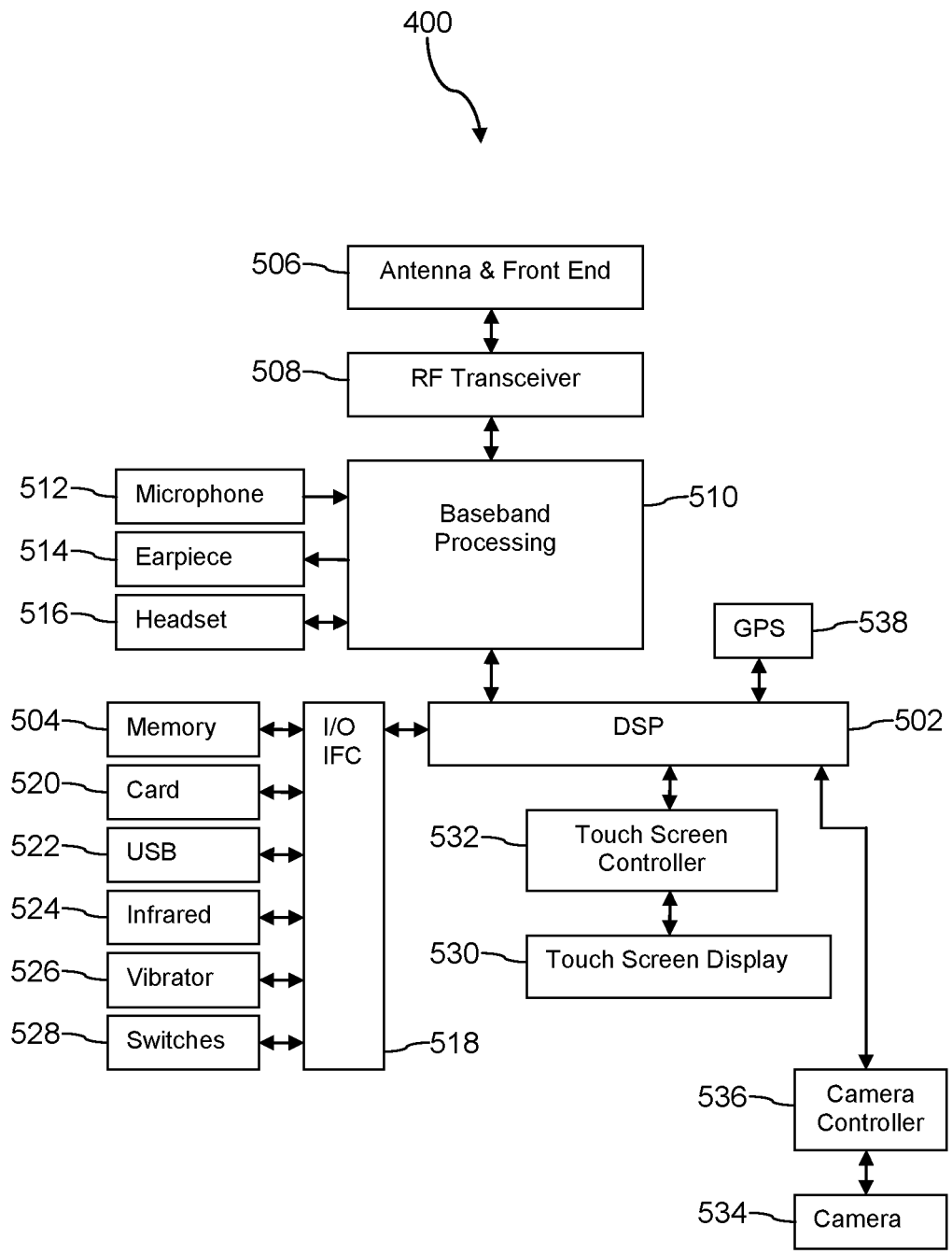
FIG. 5 is a block diagram of a hardware architecture of a communication device according to an embodiment of the disclosure.

FIG. 5 shows a block diagram of the UE 400. While a variety of known components of smart appliances are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position. In an embodiment, the UE 400 is the UE 102 of FIG. 1 that may include a smart high-science appliance such as a smart vehicle, a smart appliance (for example, a smart refrigerator), a smart phone, a wearable computer, a personal digital assistant (PDA), a headset computer, a laptop computer, a notebook computer, and a tablet computer.

Figure 6A:
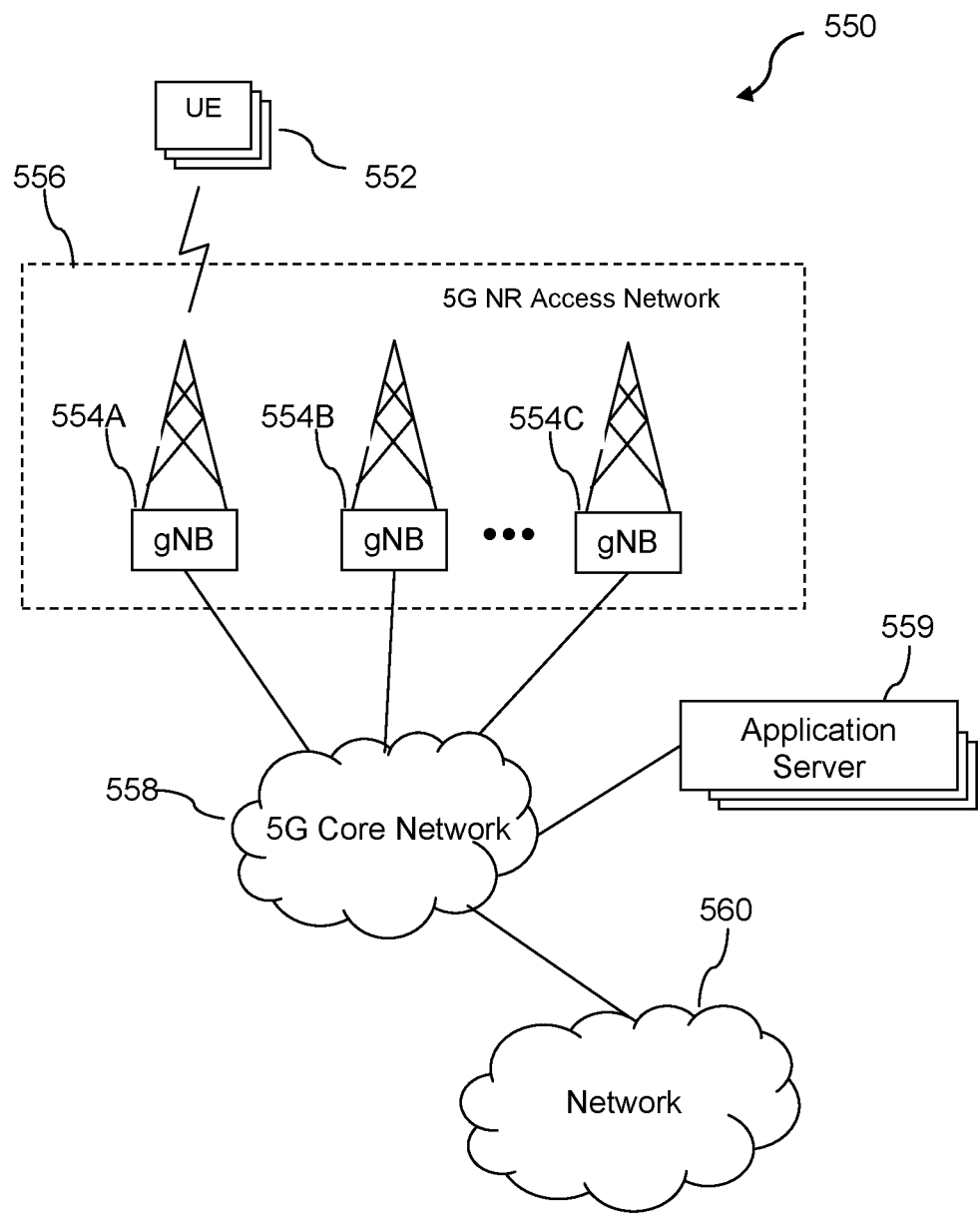
FIG. 6A is a block diagram of a communication system according to an embodiment of the disclosure.

Turning now to FIG. 6A, an exemplary communication system 550 is described. Parts of the 5G communication network 120 described above with reference to FIG. 1 may be implemented substantially like the communication system 550 described in FIG. 6A and FIG. 6B. Typically the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the sub-systems 106 or the UE 122 that operate with the 5G communication network 120 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the sub-systems may communicate via the access nodes 554A-554C.

The communication system 550 could operate in accordance with a particular radio access technology (RAT), with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The CU may be hosted in user equipment.

Figure 6B:
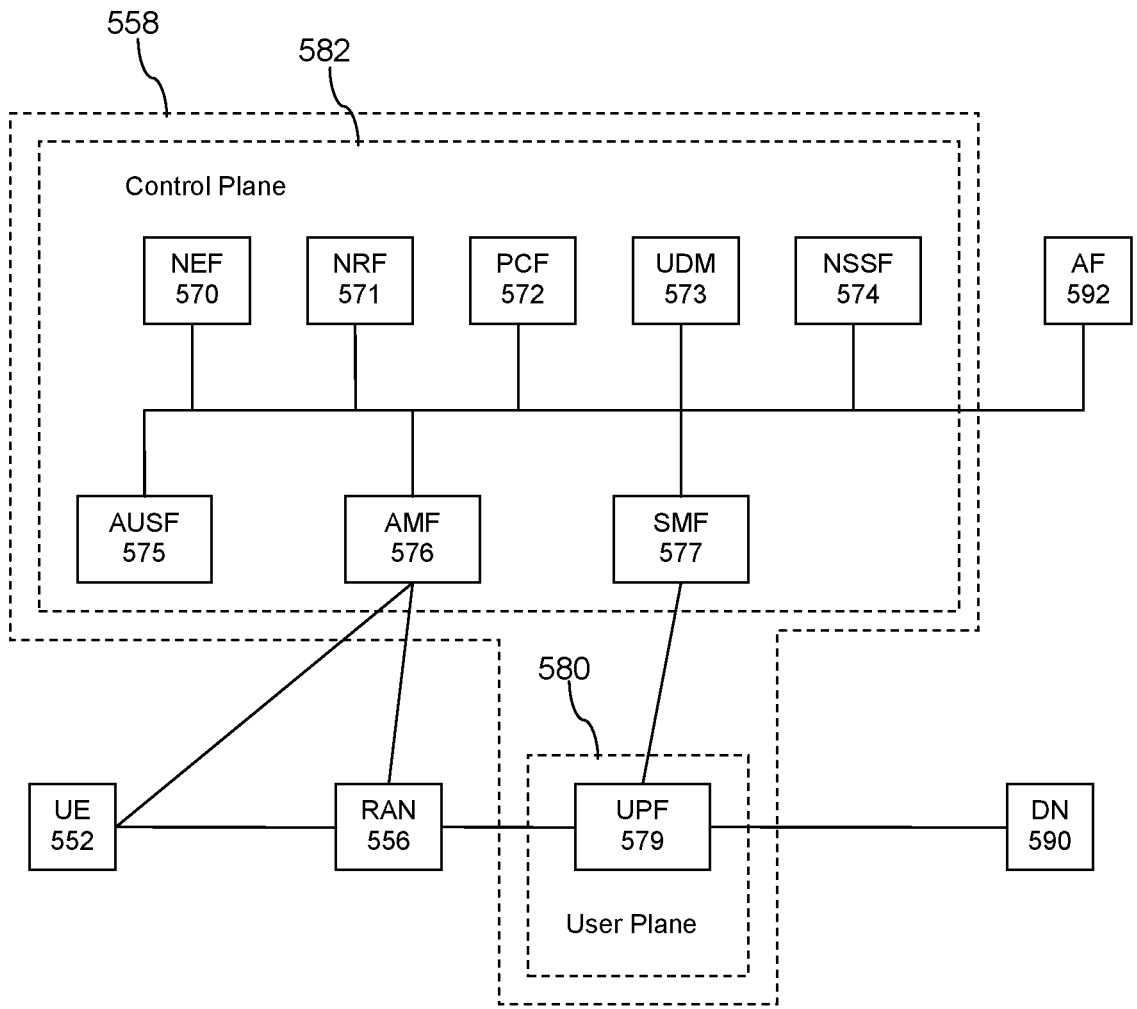
FIG. 6B is a block diagram of a core network of a communication system according to an embodiment of the disclosure.

Turning now to FIG. 6B, further details of the core network 558 are described. In an embodiment, the core network 558 is a 5G core network. In an embodiment, the core network 558 may be constructed on the UE 102 (FIG. 1). 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed on user equipment such as, for example, executed on the UE 102 of FIG. 1. These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A or the communication network 120 in FIG. 1). As discussed above, the UE 552 may be the sub-systems 106 or the UE 122 that operate with the 5G communication network 120 (FIG. 1). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7A:
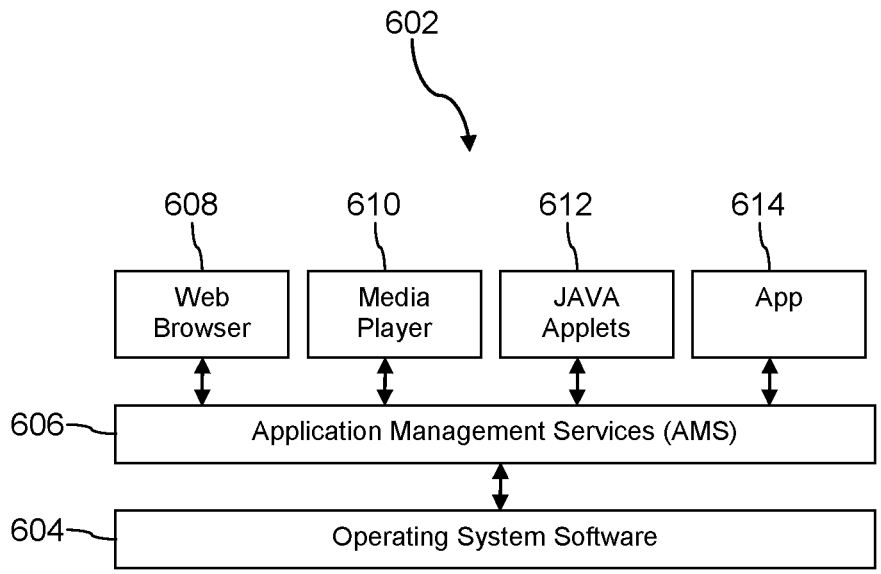
FIG. 7A is a block diagram of software architecture of a communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and applications 614. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The applications 614 may be executed by the UE 400 to support productivity and other user functionalities and/or services.

Figure 7B:
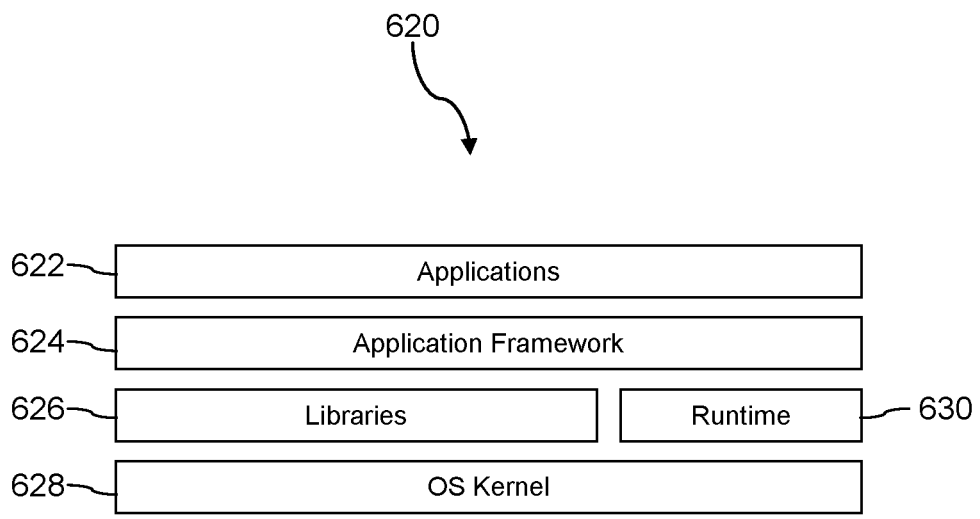
FIG. 7B is a block diagram of another software architecture of a communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
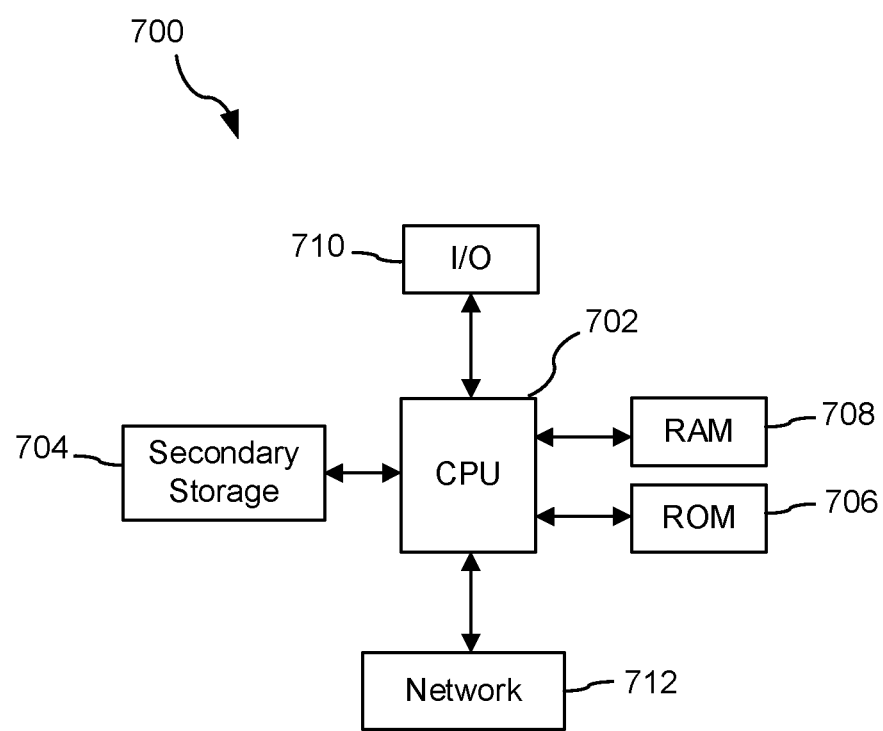
FIG. 8 is a block diagram of a computer system according to an embodiment of the disclosure.

FIG. 8 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 702 may execute a computer program or application. For example, the CPU 702 may execute software or firmware stored in the ROM 706 or stored in the RAM 708. In some cases, on boot and/or when the application is initiated, the CPU 702 may copy the application or portions of the application from the secondary storage 704 to the RAM 708 or to memory space within the CPU 702 itself, and the CPU 702 may then execute instructions that the application is comprised of. In some cases, the CPU 702 may copy the application or portions of the application from memory accessed via the network connectivity devices 712 or via the I/O devices 710 to the RAM 708 or to memory space within the CPU 702, and the CPU 702 may then execute instructions that the application is comprised of. During execution, an application may load instructions into the CPU 702, for example load some of the instructions of the application into a cache of the CPU 702. In some contexts, an application that is executed may be said to configure the CPU 702 to do something, e.g., to configure the CPU 702 to perform the function or functions promoted by the subject application. When the CPU 702 is configured in this way by the application, the CPU 702 becomes a specific purpose computer or a specific purpose machine.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 712 may provide wired communication links and/or wireless communication links (e.g., a first network connectivity device 712 may provide a wired communication link and a second network connectivity device 712 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A communication device, comprising:
a transceiver comprising an antenna; and
a system-on-chip comprising:
   a central processing unit (CPU); and
   a non-transitory memory comprising a micro-kernel of a fifth generation (5G) core network that when executed by the CPU, causes the micro-kernel to:
     execute instructions of the micro-kernel in a trusted security zone (TSZ) execution mode;
     create virtualized network functions (VNFs) of a core network in the TSZ execution mode, wherein the virtualized network functions are associated with a 5G core network;
     instantiate a 5G communication network using the antenna and the 5G core network in response to creating the VNFs of the core network;
     receive requests from subscribers of the 5G communication network, wherein the subscribers comprise sub-systems of the communication device; and connect the subscribers to the 5G communication network using the VNFs in response to receiving the requests from subscribers of the 5G communication network, wherein the communication device is a smart vehicle or a smart refrigerator, and wherein at least one of the sub-systems comprises a refrigeration system, sensors, lighting systems, or refrigerated containers when the communication device is the smart refrigerator.

2. The communication device of claim 1, wherein the micro-kernel comprises a reduced instruction set of a kernel of the 5G core network.

3. The communication device of claim 1, wherein at least one of the sub-systems comprises an entertainment system, an electrical system, an engine system or a braking system when the communication device is the smart vehicle.

4. The communication device of claim 1, wherein the communication device comprises a radio transceiver that is configured to establish a wireless communication link according to at least one of 5G, a long term evolution (LTE), a code division multiple access (CDMA), or a global system for mobile communications (GSM) telecommunication protocol.

5. The communication device of claim 1, wherein the instructions further causes the micro-kernel to connect the subscribers to an external communication network of a mobile operator or the Internet.

6. A communication device, comprising:
a central processing unit (CPU) comprising a hardware root of trust; and
a non-transitory memory comprising virtualized network functions (VNFs) comprising instructions that when executed by the CPU, cause the VNFs to:
instantiate a fifth generation (5G) communication network;
receive requests from subscribers of the 5G communication network, wherein the subscribers comprise sub-systems of the communication device; and
connect the subscribers to the 5G communication network using the VNFs in response to receiving the requests from subscribers of the 5G communication network,
wherein the communication device is a smart vehicle or a smart refrigerator, and
wherein at least one of the sub-systems comprises an entertainment system, an electrical system, an engine system or a braking system when the communication device is the smart vehicle.

7. The communication device of claim 6, further comprising a cellular transceiver comprising an antenna, wherein the VNFs are network functions of a 5G core network, and wherein the instructions further cause the VNFs to instantiate the 5G communication network using the antenna and the VNFs.

8. The communication device of claim 7, wherein the cellular transceiver is configured to establish a wireless communication link according to at least one of a 5G, a long term evolution (LTE), a code division multiple access (CDMA), or a global system for mobile communications (GSM) telecommunication protocol.

9. The communication device of claim 6, wherein at least one of the sub-systems comprises a refrigeration system, sensors, lighting systems, or refrigerated containers when the communication device is the smart refrigerator.

10. The communication device of claim 6, wherein the instructions further cause the VNFs to connect the subscribers to an external communication network of a mobile operator or the Internet.

11. A method for instantiating a communication network implemented by a communication device, wherein the method comprises:
executing instructions of a micro-kernel in a trusted security zone (TSZ) execution mode;
create virtualized network functions (VNFs) of a core network in the TSZ execution mode, wherein the virtualized network functions are associated with a 5G core network;
instantiate a 5G communication network using an antenna and the 5G core network in response to creating the VNFs of the core network;
receive requests from subscribers of the 5G communication network, wherein the subscribers comprise sub-systems of the communication device; and
connect the subscribers to the 5G communication network in response to receiving the requests from subscribers of the 5G communication network,
wherein the communication device is a smart vehicle or a smart refrigerator,
wherein at least one of the sub-systems comprises a refrigeration system, sensors, lighting systems, or refrigerated containers when the communication device is the smart refrigerator, and
wherein at least one of the sub-systems comprises an entertainment system, an electrical system, an engine system or a braking system when the communication device is the smart vehicle.

12. The method of claim 11, wherein the micro-kernel comprises a reduced instruction set of a kernel of the 5G core network.

* * * * *